United States Patent
Vignali et al.

(10) Patent No.: US 9,470,104 B2
(45) Date of Patent: Oct. 18, 2016

(54) AIR CYCLE MACHINE WITH SEAL SHAFT

(71) Applicant: HAMILTON SUNDSTRAND CORPORATION, Windsor Locks, CT (US)

(72) Inventors: Mark Vignali, Northfield, CT (US); Robert M. Pragluski, Springfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 708 days.

(21) Appl. No.: 13/755,066

(22) Filed: Jan. 31, 2013

(65) Prior Publication Data
US 2014/0210167 A1   Jul. 31, 2014

(51) Int. Cl.
*F04D 29/10*  (2006.01)
*F01D 11/02*  (2006.01)
*F16J 15/447* (2006.01)

(52) U.S. Cl.
CPC ............ *F01D 11/02* (2013.01); *F16J 15/4472* (2013.01); *F05D 2220/50* (2013.01)

(58) Field of Classification Search
CPC ...... F04D 29/08; F04D 29/083; F04D 29/10; F04D 29/102; F04D 29/12; F04D 29/122; F16J 15/16; F16J 15/34; F16J 15/3464; F16J 15/4472; F01D 11/00
USPC ................................ 415/231, 174.3; 277/361
See application file for complete search history.

(56) References Cited

U.S. PATENT DOCUMENTS

| | | | |
|---|---|---|---|
| 3,286,335 A * | 11/1966 | Di Pietra | 29/888.3 |
| 4,625,977 A * | 12/1986 | Azibert | F16J 15/008 277/361 |
| 5,784,894 A | 7/1998 | Army, Jr. et al. | |
| 5,921,683 A * | 7/1999 | Merritt | F16C 17/024 384/103 |
| 6,058,715 A | 5/2000 | Strang et al. | |
| 6,427,471 B1 | 8/2002 | Ando et al. | |
| 6,899,520 B2 * | 5/2005 | Habedank et al. | 415/174.5 |
| 6,957,543 B1 | 10/2005 | Reznik | |
| 7,151,909 B2 | 12/2006 | Nishi et al. | |
| 7,779,644 B2 | 8/2010 | Decrisantis et al. | |
| 8,272,139 B2 | 9/2012 | Zhang et al. | |
| 8,333,549 B2 | 12/2012 | Nims | |
| 8,347,647 B2 | 1/2013 | McAuliffe et al. | |
| 2012/0156031 A1 * | 6/2012 | Rosen et al. | 415/230 |

* cited by examiner

*Primary Examiner* — Eric Keasel
*Assistant Examiner* — Maxime Adjagbe
(74) *Attorney, Agent, or Firm* — Carlson, Gaskey & Olds, PC

(57) ABSTRACT

A seal shaft for use in an air cycle machine has two axial edges. An axial distance is measured between contact faces at the axial edges, with a tolerance to the dimension. A greatest variation between the axial distance at a plurality of spaced locations on the edge face is maintained with a ratio of the greatest variation to the tolerance being less than 0.2. A rotor assembly, an air cycle machine and a method are also disclosed.

9 Claims, 2 Drawing Sheets

AIR CYCLE MACHINE WITH SEAL SHAFT

BACKGROUND OF THE INVENTION

This application relates to a seal shaft for supporting a seal in an air cycle machine and wherein the seal shaft is designed to eliminate variation in distance between seal shaft faces.

Air cycle machines are known and are often utilized in aircraft air supply systems, such as conditioning air for use in an aircraft cabin.

In an air cycle machine, a pair of turbine rotors are driven by pressurized air to, in turn, drive a shaft which drives a compressor and a fan. Air compressed by the compressor and moved by the fan is utilized for various operations on an associated aircraft.

In one type of air cycle machine, a first stage turbine rotor is positioned axially adjacent the compressor rotor. A disk shaped seal is fixed in the housing between the two rotors. A seal shaft rotates with the main shaft and radially inward of this disk seal. In the prior art, the seal shaft has sometimes had variation along axial edges. Even a small variation in the position of the edges on the seal shaft can result in a kinking between the two rotors. That is, if the seal shaft edges are not as desired, there may be a variation in the center of gravity of the rotors creating an imbalance, which can cause vibration.

SUMMARY OF THE INVENTION

A seal shaft for use in an air cycle machine has two axial edges. An axial distance is measured between contact faces at the axial edges, with a tolerance to the dimension. A greatest variation between the axial distance at a plurality of spaced locations on the edge faces is maintained with a ratio of the greatest variation to the tolerance being less than 0.2. A rotor assembly, an air cycle machine and a method are also disclosed.

These and other features may be best understood from the following drawings and specification.

DETAILED DESCRIPTION

Figure 1:
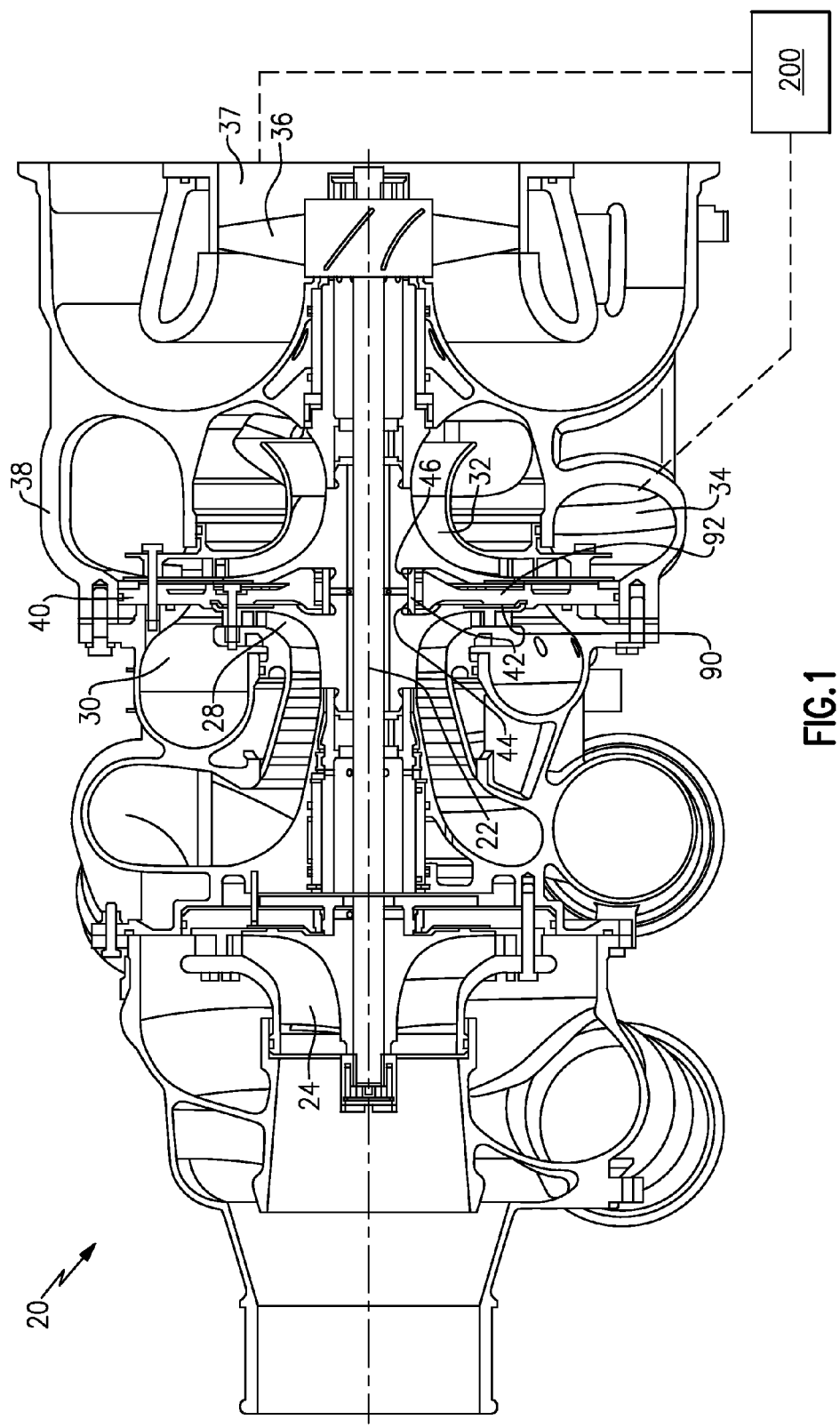
FIG. 1 schematically shows an air cycle machine.

An air cycle machine 20 is illustrated in FIG. 1. A shaft 22 is driven by a first stage turbine rotor 28, which receives a source of pressurized air. The pressurized air drives the first stage turbine 28 to rotate and then passes over a second stage turbine 24. The two turbine stages 24 and 28 drive the shaft 22 and also, in turn, drive a compressor rotor 32 and a fan rotor 36. An outlet 34 on the compressor and an outlet 37 on the fan 36 communicate with a use of air 200 on an aircraft, shown schematically.

A disk seal 40 has seal faces 90 and 92 between the rotors 28 and 32, respectively. The disk seal 40 is supported on a seal shaft 42. The seal shaft 42 has axial edges 44 and 46, which are positioned between structure on an associated shaft portion 99. Seal shaft 42 rotates with rotors 28 and 32. The seal shaft 42 may be press-fit on the rotors 28 and 32.

As mentioned above, the seal shaft 42 must be precisely placed and supported, otherwise, there may be variation in the location of the disk seal 40 relative to one of the rotors 28 and 32.

Figure 2:
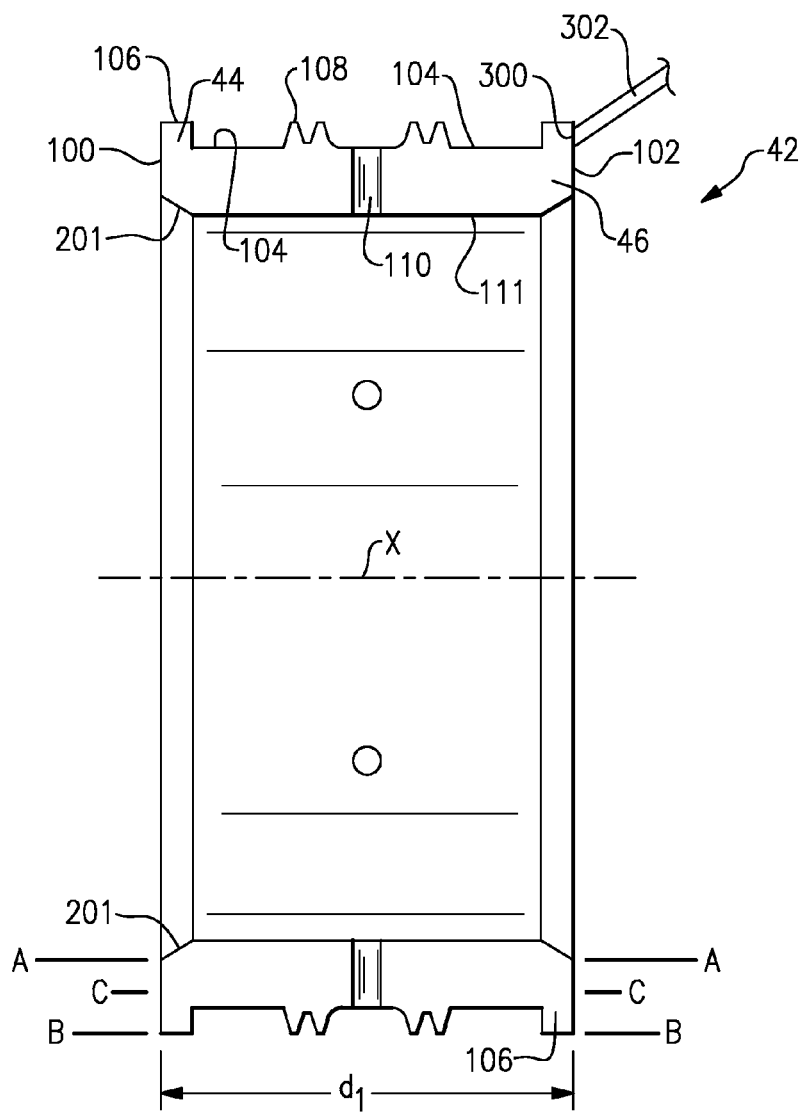
FIG. 2 shows a seal shaft for use in the air cycle machine of FIG. 1.

The seal shaft 42 is better illustrated in FIG. 2. There are axial contact faces 100 and 102, which are associated with the axial edges 44 and 46, respectively. Outer ledges 106 are formed at each edge 44 and 46, and a radially inner surface 104 is at the outer periphery axially inwardly of the edges 106. There are upwardly extending features 108 extending radially outwardly of the inner surface 104 and air holes 110 spaced circumferentially.

A distance $d_1$ can be defined between the contact faces 100 and 102 along an axial center line X. In one embodiment, $d_1$ was 0.770 inch (1.955 cm) plus or minus 0.002 inch (0.005 cm).

Figure 3:
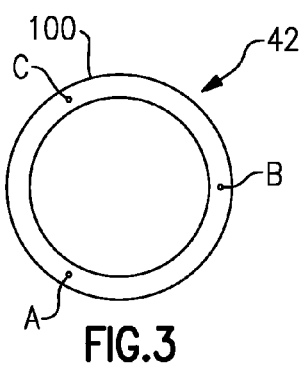
FIG. 3 shows a front view of a seal shaft.

As is illustrated, there are a number of radially spaced locations on the contact faces 100 and 102 shown as A, B and C. FIG. 3 makes clear the spaced locations A, B, and C may be circumferentially spaced. There are, of course, an infinite number of these locations. At any one of these locations, the precise distance $d_1$ may vary. In the prior art, with a seal shaft having the dimension mentioned above, a tolerance between the $d_1$ distances measured at A, B or C was kept beneath 0.0005 inch (0.0012 cm). This has sometimes led to the kinking problem mentioned above.

Applicant's current disclosure ensures that a difference between the distance $d_1$ measured at A, B and C (and the other infinite distances) will be kept to less than 0.0003 inch. Stated another way, the variation allowed between the distances $d_1$ at the distinct radial locations is kept relatively small and such that a ratio of the greatest variation between the distances A, B and C to the absolute value of the tolerance (here 0.002) is less than 0.2, preferably less than 0.175, and most desirably 0.15.

For purposes of defining the contact faces 100 and 102, chamfers 201 formed between a bore 111 and contact faces 100 and 102 are not part of the contact faces 100 and 102.

The variation may be measured utilizing known techniques.

As shown schematically in FIG. 2, should a greater variation be found at a location 300, further machining as shown schematically by tool 302 may be performed at that location.

A method as disclosed includes the steps of removing a seal shaft from a housing from a location intermediate a turbine rotor 28 and a compressor rotor 32. The removed seal shaft is replaced by a seal shaft 42 as disclosed above.

The method as mentioned above is somewhat simplified. In fact, to replace the seal shaft, the air cycle machine 20 generally has to be removed, including disassembling housings and the rotors. To remove the existing seal shaft, the press-fit would have to be broken. A new press-fit with a replacement seal shaft 42 may be achieved by cooling the rotors 28 and 32 in liquid nitrogen, prior to mating with the new seal shaft 42.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A seal shaft for use in an air cycle machine comprising:
a body centered on a central axis, said body defining an inner bore and an outer surface including radially outwardly extending ledges at each of two axial edges, and a radially inner surface at an outer peripheral surface, with radially outwardly extending feature axially spaced on an opposed side of said radially inner surface relative to said outwardly extending ledges and a plurality of air holes extending from said outer peripheral surface to said inner bore;

an axial distance measured between contact faces on said axial edges, a tolerance to said axial distance, and a greatest variation maintained between said axial distance at a plurality of spaced locations on said contact faces, with a ratio of said greatest variation to said tolerance being less than 0.2; and wherein said axial distance is 0.770 in (1.95 cm), said tolerance is 0.002 in (0.005 cm) and said greatest variation is 0.0003 in (0.762 cm).

2. The seal shaft as set forth in claim 1, wherein said ratio is less than 0.175.

3. A rotor assembly for use in an air cycle machine comprising:

a pair of turbine rotors rotating with a shaft, a compressor rotor rotating with said shaft, and a fan rotor rotating with said shaft and a seal shaft positioned intermediate one of said turbine rotors and said compressor rotor;

said seal shaft including a body centered on a central axis, said body defining an inner bore and an outer surface including radially outwardly extending ledges at each of two axial edges, and a radially inner surface at an outer peripheral surface, with radially outwardly extending features axially spaced on an opposed side of said radially inner surface relative to said outwardly extending ledges and a plurality of air holes extending from said outer peripheral surface to said inner bore, an axial distance measured between contact faces on said axial edges, a tolerance to said axial distance, and a greatest variation maintained between said axial distance at a plurality of spaced locations on said contact faces, with a ratio of said greatest variation to said tolerance being less than 0.2; and wherein said axial distance is 0.770 in (1.95 cm), said tolerance is 0.002 in (0.005 cm) and said greatest variation is 0.0003 in (0.762 cm).

4. The rotor assembly as set forth in claim 3, wherein said ratio is less than 0.175.

5. An air cycle machine comprising:

a housing receiving a rotor assembly, the rotor assembly including a pair of turbine rotors rotating with a shaft, a compressor rotor rotating with said shaft, and a fan rotor rotating with said shaft and a seal shaft positioned intermediate one of said turbine rotors and said compressor rotor;

said seal shaft including a body centered on a central axis, said body defining an inner bore and an outer surface including radially outwardly extending ledges at each of two axial edges, and a radially inner surface at an outer peripheral surface, with radially outwardly extending features axially spaced on an opposed side of said radially inner surface relative to said outwardly extending ledges and a plurality of air holes extending from said outer peripheral surface to said inner bore, an axial distance measured between contact faces on said axial edges, a tolerance to said axial distance, and a greatest variation maintained between said axial distance at a plurality of spaced locations on said contact faces, with a ratio of said greatest variation to said tolerance being less than 0.2 , and wherein said axial distance is 0.770 in (1.95 cm), said tolerance is 0.002 in (0.005 cm) and said greatest variation is 0.0003 in (0.762 cm).

6. The air cycle machine as set forth in claim 5, wherein said ratio is less than 0.175.

7. A method of replacing a seal shaft in an air cycle machine comprising the steps of:

removing a seal shaft from a housing from a location intermediate a turbine rotor and a compressor rotor and replacing a new seal shaft;

said new seal shaft including a body centered on a central axis, said body defining an inner bore and an outer surface including radially outwardly extending ledges at each of two axial edges, and a radially inner surface at an outer peripheral surface, with radially outwardly extending features axially spaced on an opposed side of said radially inner surface relative to said outwardly extending ledges and a plurality of air holes extending from said outer peripheral surface to said inner bore, an axial distance measured between contact faces on said axial edges, a tolerance to said axial distance, and a greatest variation maintained between said axial distance at a plurality of spaced locations on said contact faces, with a ratio of said greatest variation to said tolerance being less than 0.2; and wherein said axial distance is 0.770 in (1.95 cm), said tolerance is 0.002 in (0.005 cm) and said greatest variation is 0.0003 in (0.762 cm).

8. The method as set forth in claim 7, wherein said ratio is less than 0.175.

9. The method as set forth in claim 7, wherein the replacement of the new seal shaft includes establishing a press-fit between the new seal shaft, and the turbine and compressor rotors.

* * * * *